No. 892,498. PATENTED JULY 7, 1908.
W. W. BATEMAN.
DEVICE FOR FILLING SILOS.
APPLICATION FILED NOV. 18, 1907.
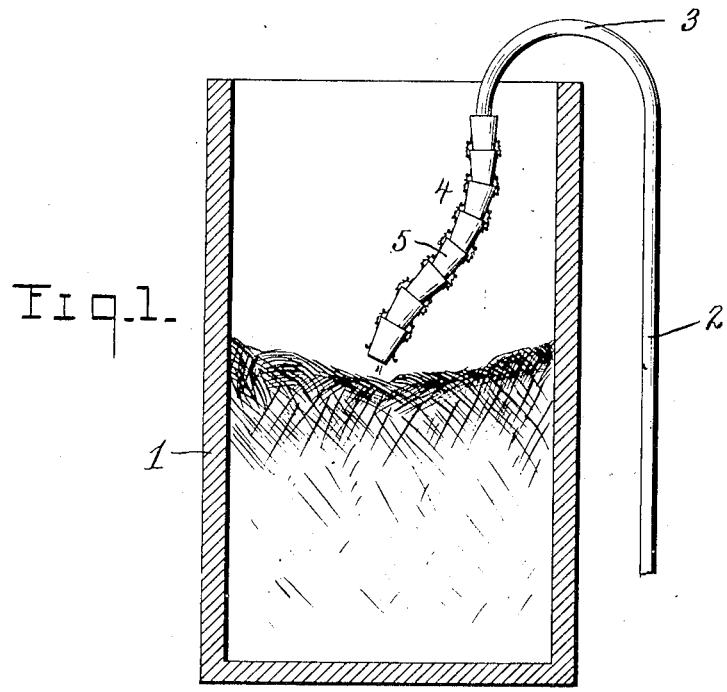
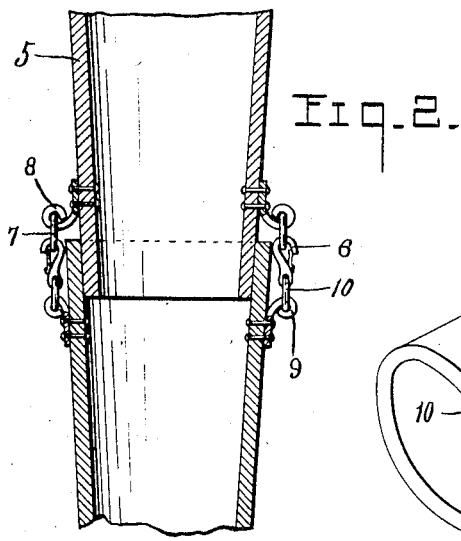
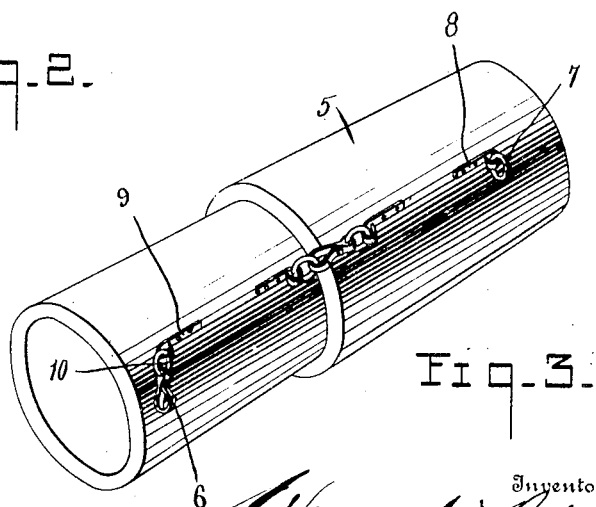
Witnesses
Chas. T. Jennings
L. O. Little
Inventor
William W. Bateman
By Watson E. Coleman
Attorney

UNITED STATES PATENT OFFICE.

WILLIAM WESLEY BATEMAN, OF BOONVILLE, INDIANA.

DEVICE FOR FILLING SILOS.

No. 892,498.  Specification of Letters Patent.  Patented July 7, 1908.

Application filed November 18, 1907. Serial No. 402,694.

*To all whom it may concern:*

Be it known that I, WILLIAM WESLEY BATEMAN, a citizen of the United States, residing at Boonville, in the county of Warrick and State of Indiana, have invented certain new and useful Improvements in Devices for Filling Silos, of which the following is a specification, reference being had to the accompanying drawings.

My invention is a device for use in filling silos and for analogous purposes.

In filling silos with fodder, ensilage or other feed it is common to employ an upright supply pipe having its lower end connected to suitable mechanism for forcing the feed through the pipe by means of a blast of air and having at its upper end a returned bend which opens into the top of the silo so as to discharge the feed therein. When such an apparatus is employed it is necessary for several men to be within the silo and spread the feed out evenly and pack it down.

The object of the invention is to provide upon the supply pipe means whereby the feed may be directed to any particular part of the silo and thus spread out evenly and at the same time employ the blast of air for packing the same.

With the above and other objects in view the invention consists of the novel features of construction and the combination and arrangement of parts hereinafter described and claimed and illustrated in the accompanying drawings, in which Figure 1 is a vertical section through a silo illustrating the use of my invention; Fig. 2 is a sectional view of two of the sections of my improved flexible discharge pipe; and Fig. 3 is a perspective view of the same.

In the drawings 1 denotes a silo, 2 the feed supply pipe having at its upper end a returned bend 3 to project over the top of the wall of the silo and to discharge the feed therein. The lower end of the feed pipe 2 is adapted to be connected to a suitable mechanism (not illustrated) for forcing the feed through the pipe by means of a blast of air.

4 denotes a flexible discharge pipe composed of a plurality of detachably connected sections 5. These sections 5 are preferably tapered longitudinally so that they are of frusto-conical form to permit their small end to telescope into the large end of the adjacent section. The taper of these sections is slight so that they fit each other sufficiently close to prevent the escape of the feed between them and at the same time render the pipe 4 sufficiently flexible to permit its lower end to be moved in any direction so that the feed may be directed to any part of the silo. The sections are detachably connected together and prevented from telescoping each other beyond a predetermined extent by providing snap hooks or similar devices 6 upon the large end of each section and rings or eyes 7 arranged upon the small end and adapted to be engaged by the snap hooks. The rings 7 are loosely or pivotally connected by straps 8 and the hooks 6 are flexibly connected by similar straps 9 and rings or links 10 as clearly shown in Figs. 2 and 3. Two or more of these detachable connections are preferably provided between each two sections and are arranged at opposite points or at equal distances apart so that the sections will be held in proper alinement with each other. It will be noted that said connections not only detachably unite the sections but also limit the telescoping movement of one with respect to the other.

In using the invention a sufficient number of the sections 5 are connected together so that when the uppermost one is attached to the end 3 of the supply pipe 2 the lowermost one will be disposed adjacent to the bottom of the silo. As the latter is filled the lower sections of the discharge pipe are successively detached so that the discharge pipe may always be of such length that its lower end may be moved over the body of feed in the silo to direct the blast of air and the feed which it carries to any part of such body. By providing a flexible discharge pipe of this character it will be seen that one man may easily distribute the feed evenly and at the same time pack the same.

While I have shown and described the preferred embodiment of my invention I wish it understood that I do not limit myself to the precise construction set forth since various changes in the form, proportion and minor details may be resorted to without departing from the spirit or sacrificing any of the advantages of the invention.

Having thus described my invention what I claim is:

A discharge conductor, comprising a plurality of tapered cylindrical sections having their ends telescoped, straps secured at opposite points adjacent to one end of each of said sections, loops or eyes pivoted in said straps, similar straps secured at opposite points adjacent to the other end of each of said sections and snap hooks loosely connected to the last mentioned straps and adapted to engage the loops or eyes to detachably unite said sections, substantially as described.

In testimony whereof I hereunto affix my signature in the presence of two witnesses.

WILLIAM WESLEY BATEMAN.

Witnesses:
GEO. W. RUDOLPH,
W. J. BATEMAN.